United States Patent
Ogihara et al.

(10) Patent No.: US 8,783,402 B2
(45) Date of Patent: Jul. 22, 2014

(54) VEHICLE ELECTRIC EQUIPMENT MOUNTING STRUCTURE

(75) Inventors: Yasushi Ogihara, Saitama (JP); Harumi Takedomi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 174 days.

(21) Appl. No.: 13/387,298

(22) PCT Filed: Jul. 26, 2010

(86) PCT No.: PCT/JP2010/062559
§ 371 (c)(1),
(2), (4) Date: Jan. 26, 2012

(87) PCT Pub. No.: WO2011/013634
PCT Pub. Date: Feb. 3, 2011

(65) Prior Publication Data
US 2012/0118655 A1 May 17, 2012

(30) Foreign Application Priority Data
Jul. 27, 2009 (JP) ................................. 2009-174243

(51) Int. Cl.
*B60R 16/04* (2006.01)
(52) U.S. Cl.
USPC .......................................... 180/68.5; 903/907
(58) Field of Classification Search
USPC .......................................... 180/68.5; 903/907
See application file for complete search history.

(56) References Cited

U.S. PATENT DOCUMENTS

| 5,641,031 | A  | * | 6/1997  | Riemer et al. | 429/423  |
|-----------|----|---|---------|---------------|----------|
| 6,188,574 | B1 | * | 2/2001  | Anazawa       | 361/695  |
| 6,978,855 | B2 | * | 12/2005 | Kubota et al. | 429/442  |
| 7,048,321 | B2 | * | 5/2006  | Bandoh et al. | 296/37.8 |
| 7,051,825 | B2 | * | 5/2006  | Masui et al.  | 180/68.5 |
| 7,172,042 | B2 | * | 2/2007  | Yamaguchi et al. | 180/65.1 |

(Continued)

FOREIGN PATENT DOCUMENTS

| CN | 1747851 A   | 3/2006 |
|----|-------------|--------|
| CN | 101224727 A | 7/2008 |

(Continued)

OTHER PUBLICATIONS

Russian Office Action dated Mar. 18, 2013, issued in corresponding Russian Patent Application No. 2012106495, with English translation (5 pages).

(Continued)

*Primary Examiner* — Jeffrey J Restifo
(74) *Attorney, Agent, or Firm* — Westerman, Hattori, Daniels & Adrian, LLP

(57) ABSTRACT

In a vehicle having rear seats which can be swung up, a vehicle electric equipment mounting structure is provided which can ensure a sufficient space at a rear part of the vehicle which allows passengers to walk therethrough while arranging vehicle driving electric motor-related electric equipment at the rear part of the vehicle. Third row seats 5 which can be swung up towards side walls 9a are provided at a rear part of a vehicle 1. Electric equipment such as a battery unit 21, an inverter unit 22 and a DC-DC converter unit 23 is accommodated within a downwardly depressed portion 11 in a floor panel 2 underneath a rear lid board 34 on which the third row seats 5, taking a seating posture, are positioned.

6 Claims, 6 Drawing Sheets

(56) References Cited

U.S. PATENT DOCUMENTS

| | | | |
|---|---|---|---|
| 7,631,712 B2* | 12/2009 | Watanabe | 180/68.5 |
| 7,637,335 B2* | 12/2009 | Hayashi | 180/68.5 |
| 7,654,351 B2* | 2/2010 | Koike et al. | 180/68.5 |
| 7,678,494 B2* | 3/2010 | Tsuchiya | 429/120 |
| 7,688,582 B2* | 3/2010 | Fukazu et al. | 361/690 |
| 7,717,207 B2* | 5/2010 | Watanabe et al. | 180/68.5 |
| 7,743,863 B2* | 6/2010 | Shindou | 180/68.5 |
| 7,810,596 B2* | 10/2010 | Tsuchiya | 180/68.5 |
| 7,819,215 B2* | 10/2010 | Tsuchiya | 180/68.5 |
| 7,823,672 B2* | 11/2010 | Watanabe et al. | 180/68.5 |
| 7,836,999 B2* | 11/2010 | Kato | 180/312 |
| 7,900,728 B2* | 3/2011 | Suzuki et al. | 180/68.5 |
| 7,921,951 B2* | 4/2011 | Watanabe et al. | 180/68.5 |
| 8,016,063 B2* | 9/2011 | Tsuchiya | 180/68.5 |
| 8,037,960 B2* | 10/2011 | Kiya | 180/68.5 |
| 8,042,637 B2* | 10/2011 | Nagata et al. | 180/68.5 |
| 8,276,696 B2* | 10/2012 | Lucas | 180/68.2 |
| 8,376,074 B2* | 2/2013 | Yoda | 180/68.5 |
| 8,393,426 B2* | 3/2013 | Takahashi et al. | 180/68.5 |
| 8,479,858 B2* | 7/2013 | Kodaira | 180/68.5 |
| 8,505,662 B2* | 8/2013 | Schwarz et al. | 180/68.5 |
| 2001/0030069 A1* | 10/2001 | Misu et al. | 180/68.1 |
| 2003/0057776 A1 | 3/2003 | Takase et al. | |
| 2003/0186115 A1* | 10/2003 | Shibasawa et al. | 429/100 |
| 2004/0074677 A1 | 4/2004 | Goff | |
| 2006/0237248 A1* | 10/2006 | Hayashi | 180/68.5 |
| 2008/0000703 A1* | 1/2008 | Shindou | 180/68.5 |
| 2008/0062622 A1* | 3/2008 | Fukazu et al. | 361/678 |
| 2008/0164081 A1* | 7/2008 | Watanabe et al. | 180/65.2 |
| 2008/0196957 A1* | 8/2008 | Koike et al. | 180/68.5 |
| 2010/0101881 A1* | 4/2010 | Yoda et al. | 180/68.5 |
| 2010/0170735 A1* | 7/2010 | Nakamura et al. | 180/68.5 |
| 2011/0000729 A1* | 1/2011 | Schwarz et al. | 180/68.5 |
| 2011/0139526 A1* | 6/2011 | Lucas | 180/68.1 |
| 2011/0297467 A1* | 12/2011 | Iwasa et al. | 180/65.31 |
| 2012/0160584 A1* | 6/2012 | Nitawaki | 180/68.5 |
| 2013/0248267 A1* | 9/2013 | Nitawaki, Kunihiro | 180/68.5 |

FOREIGN PATENT DOCUMENTS

| | | |
|---|---|---|
| JP | 5-82400 U | 11/1993 |
| JP | 6-199137 A | 7/1994 |
| JP | 10-264689 A | 10/1998 |
| JP | 3362480 B2 | 1/2003 |
| JP | 2003-95039 A | 4/2003 |
| JP | 2004-345448 A | 12/2004 |
| JP | 2004-345450 A | 12/2004 |
| JP | 3817953 B2 | 9/2006 |
| JP | 2007-284020 A | 11/2007 |
| JP | 2008-62780 A | 3/2008 |
| JP | 2008-152956 A | 7/2008 |

OTHER PUBLICATIONS

International Search Report of PCT/JP2010/062559; mailing date of Sep. 14, 2010.

Chinese Office Action dated Aug. 29, 2013, issued in corresponding Chinese Patent Application No. 201080032459.X (6 pages).

* cited by examiner

VEHICLE ELECTRIC EQUIPMENT MOUNTING STRUCTURE

TECHNICAL FIELD

The present invention relates to a vehicle electric equipment mounting structure and more particularly to a vehicle electric equipment mounting structure for mounting vehicle driving electric motor-related electric equipment having at least a battery in a vehicle having rear seats which can be swung up towards side walls of the vehicle.

BACKGROUND ART

Conventionally, there is know a structure for mounting a battery in a vehicle, as in FIG. 6, in which left and right seat rails 101 are fixed to each of battery boxes 100 in advance, left and right seats 102 are mounted on these seat rails 101 in advance, and the seat rails 101 are fixed to a floor 103, whereby the battery boxes 100 and the seats 102 are mounted on a vehicle, thereby reducing the mounting time of the battery boxes 100 and the seats 102 (e.g., refer to Patent Literature 1). There is also known a structure in which batteries are disposed on both sides of a tunnel portion which extends in a front-to-rear direction of a vehicle in the center thereof, outward sides of the batteries are fixed to strength members on side portions of the vehicle, and the two batteries are connected together by a reinforcement member which straddles the tunnel portion, thereby increasing rigidity of a vehicle body (e.g., refer to Patent Literature 2). Further, there is also known a structure in which a case for accommodating a power control unit is positioned between a seat and a floor pan (e.g., refer to Patent Literature 3).

RELATED ART LITERATURE

Patent Literature

Patent Literature 1: JP-2004-345448-A
Patent Literature 2: JP-3817953-B
Patent Literature 3: JP-3362480-B

SUMMARY OF THE INVENTION

Problem that the Invention is to Solve

In any of Patent Literatures 1 to 3, the batteries and the power control unit are disposed under the front seats. However, from the viewpoint of layout, it is desirable to dispose the vehicle driving electric motor-related electric equipment such as batteries in a rear part of a vehicle. On the other hand, it is preferable that electric equipment is not exposed on a floor of a vehicle in which passengers can walk at the rear part of the vehicle.

The invention has been made in view of above, and an object thereof is to provide a vehicle electric equipment mounting structure which enables a space which is sufficient to allow passengers to walk therethrough to be ensured at a rear part of a vehicle which has rear seats which can be swung up towards side walls thereof, while arranging vehicle driving electric motor-related electric equipment at the rear part of the vehicle.

Means for Solving the Problem

The disclosure describes a vehicle electric equipment mounting structure for mounting vehicle driving electric motor-related electric equipment (e.g., a battery unit 21, an inverter unit 22, a DC-DC converter unit 23 in an embodiment) including at least a battery (e.g., the battery unit 21 in the embodiment) in a vehicle (e.g., a vehicle 1 in the embodiment), wherein a rear seat (e.g., a third row seat 5 in the embodiment) is provided at a rear part of the vehicle, so as to take a seating posture by being locked on strikers (e.g., strikers 35 in the embodiment) exposed from a floor surface (e.g., a rear lid board 34 in the embodiment) and a stowing posture by releasing the locking on the strikers and swinging up towards side walls of the vehicle, and wherein the electric equipment is accommodated in a downwardly depressed floor panel (e.g., a floor panel 2 in the embodiment) to be positioned near underneath the rear seat taking the seating posture.

The disclosure further describes a structure, wherein the rear seat includes a pair of rear seats capable of taking the seating posture by being locked individually on left and right strikers and the stowing posture by releasing individually the locking on the left and right strikers, the left and right strikers being provided in a vehicle width direction, wherein sub-frames (e.g., suspension sub-frames 13, 13 in the embodiment) which support the electric equipment are fixed individually to a pair of side sills (e.g., rear side sills 12, 12 in the embodiment) which are disposed on both sides in the vehicle width direction, the sub-frames extending in the vehicle width direction, and wherein the left and right strikers are mounted on the sub-frames.

The disclosure also describes the structure, wherein the battery is provided so as to extend in a vehicle width direction, wherein the battery can be removed in a state where the rear seat takes the stowing posture, and wherein a foamed urethane resin (e.g., a foamed urethane resin 36 in the embodiment) is provided on a back surface of a seat cushion (e.g., a seat cushion 31 in the embodiment) of the rear seat.

The disclosure further describes the structure, wherein at least one of an inlet port (e.g., an intake port 41a in the embodiment) and an outlet port (e.g., an outlet port 42a in the embodiment) of a duct (e.g., a duct 40 in the embodiment) for cooling the electric equipment is positioned near underneath the rear seat taking the stowing posture.

The disclosure also describes the structure, wherein at least one of the inlet port and the outlet port is directed towards the back surface of the seat cushion.

The disclosure also describes the structure, wherein wiring harnesses (e.g., wiring harnesses Ha, Hb in the embodiment) for activating at least one of an electric power seat and an electric heater (e.g., an electric heater 37 in the embodiment) of the rear seat are connected to the battery.

The disclosure also describes the structure, wherein at least one of an inlet duct and an outlet duct for cooling the electric equipment is formed integrally with the floor surface.

The description reading "near underneath the floor surface on which the rear seats in the seating posture are positioned" is to include not only the location lying underneath the floor surface on which the rear seats in the seating posture are positioned but also a location underneath a position on the floor surface which deviates slightly to the front, rear, left or right from the rear seats resting floor surface.

The description reading "near underneath the rear seats which are swung up" is to include not only the location lying underneath the rear seat which is swung up but also a location underneath a position which deviates slightly to the front, rear, left or right from the rear seat which is swung up.

Advantage of the Invention

The gravity center of the vehicle can be lowered. While arranging the electric equipment at the rear part of the vehicle, a sufficient space allowing passenger to walk therethrough can be ensured at the rear part of the vehicle by swinging up the rear seats. Additionally, the electric equipment can be protected by the floor panel whose rigidity is increased by being depressed downwards.

The frames on which the strikers are mounted can also be shared with as the sub-frames which support the electric equipment, thereby reducing the number of parts. In addition, impacts produced when the rear seats are swung up or locked on to the strikers can be absorbed by the sub-frames, thereby preventing the application of impacts to the electric equipment including the battery. The maintainability of the battery can be increased. In addition, impact or noise produced from the electric equipment including the battery can be absorbed by the foamed urethane resin on the back surfaces of the seat cushions.

At least one of the inlet port and the outlet port of the duct is provided to the side of a wheel well above which the rear seat is positioned at all times. Therefore, not only can the sufficient space allowing passengers to walk therethrough be ensured, but also the intrusion of foreign matters can be prevented. Further, a noise absorbing effect can be exhibited by the seat cushion on the rear seats. Additionally, when the inlet port is provided in the position described above, air in the low-temperature ambient within a passenger compartment can be taken into the inlet port.

The absorption and insulation of noise from the inlet port and the outlet port is facilitated by the back surfaces of the seat cushion.

The wiring harnesses for at least either the electric power seats or the electric heaters can be made short in length, thereby facilitating easy wiring around the seats.

At least one of the inlet duct or the outlet duct can be formed easily, thereby reducing production costs. Further, the entry of dust between the ducts and the floor surface can be suppressed.

MODE FOR CARRYING OUT THE INVENTION

Figure 1:
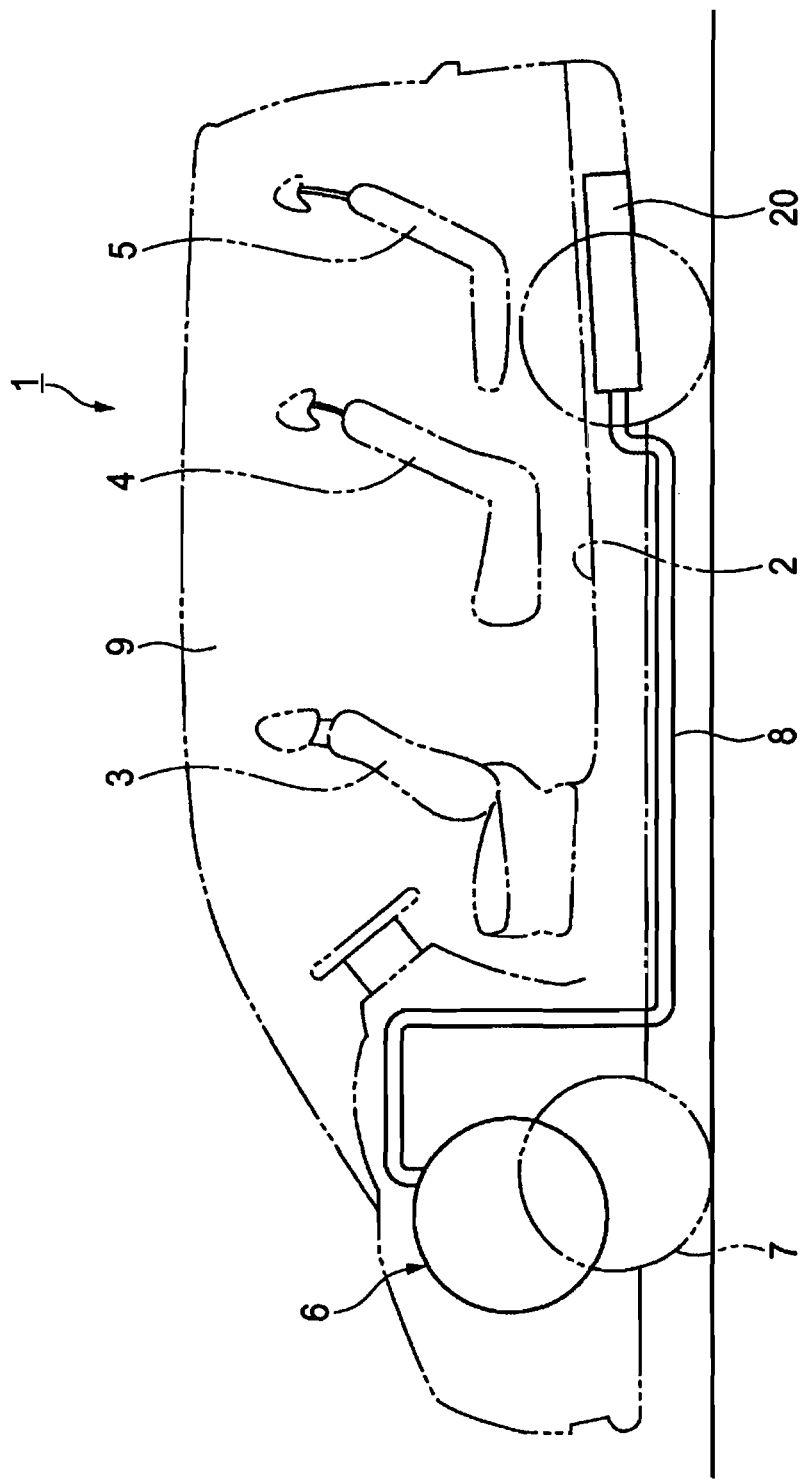
FIG. 1 is a schematic side view of a hybrid vehicle to which the invention is applied.

A vehicle electric equipment mounting structure according to an embodiment of the invention will be described by reference to the drawings. The drawings are to be seen in a direction in which reference numerals given therein look normally.

As shown in FIG. 1, a vehicle 1 according to the embodiment is a hybrid vehicle in which first row seats 3, a second row seat 4 and third row seats (rear seats) 5 are disposed on a floor panel 2. The vehicle 1 includes a power unit 6 in which an engine and a motor/generator are provided in series. The driving of the engine is assisted by the motor/generator, and when the vehicle is decelerated, power from the motor/generator is recovered.

Figure 2:
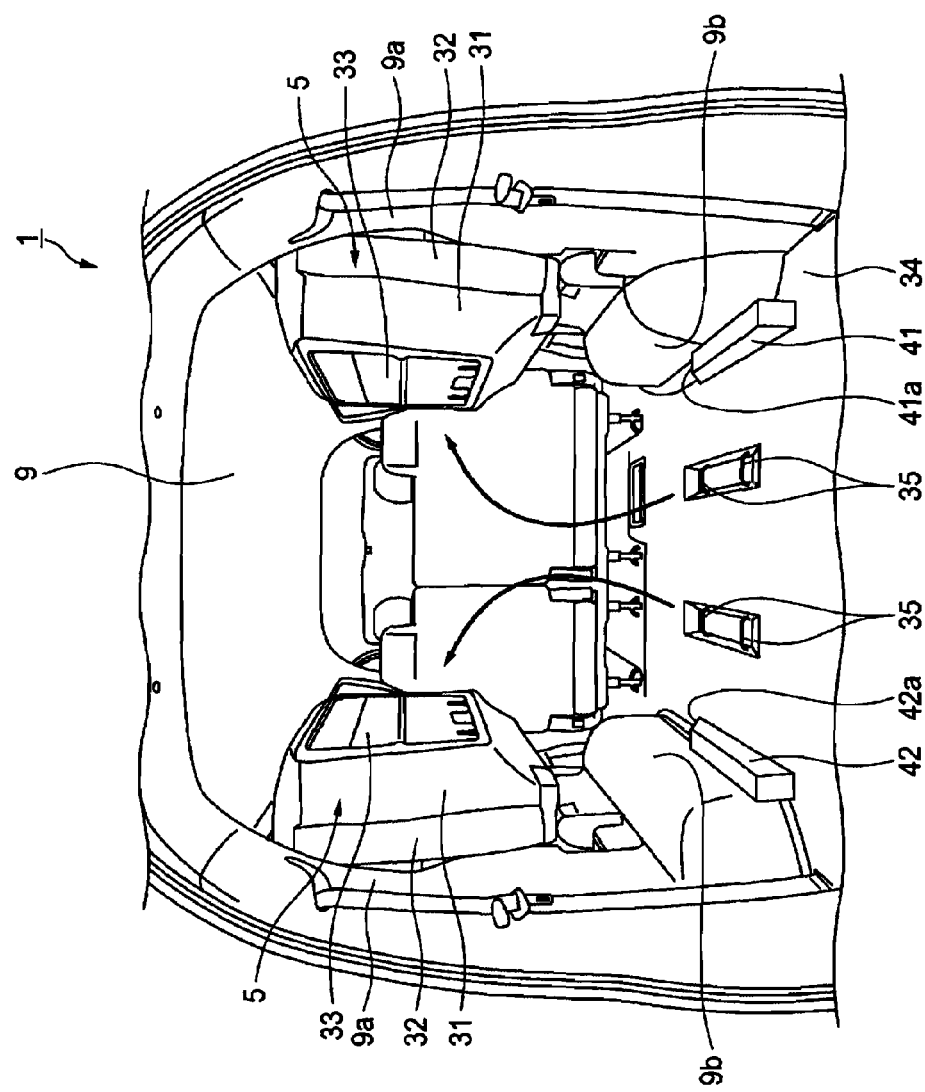
FIG. 2 is a view resulting when an interior of a passenger compartment with third row seats swung up is seen from the rear of the vehicle.

The first row seats 3 are a driver's seat and a front passenger's seat which are configured not only to slide back and forth but also to be folded. The second row seat 4 is a bench seat which is configured not only to slide back and forth but also to be folded and swung up. The third row seats 5 are left and right laterally swinging seats which can swung up towards side walls 9a (refer to FIG. 2) of the vehicle 1. In the vehicle 1, a convenient passenger compartment space 9 can be realized by variously arranging these seats 3 to 5.

Figure 3:
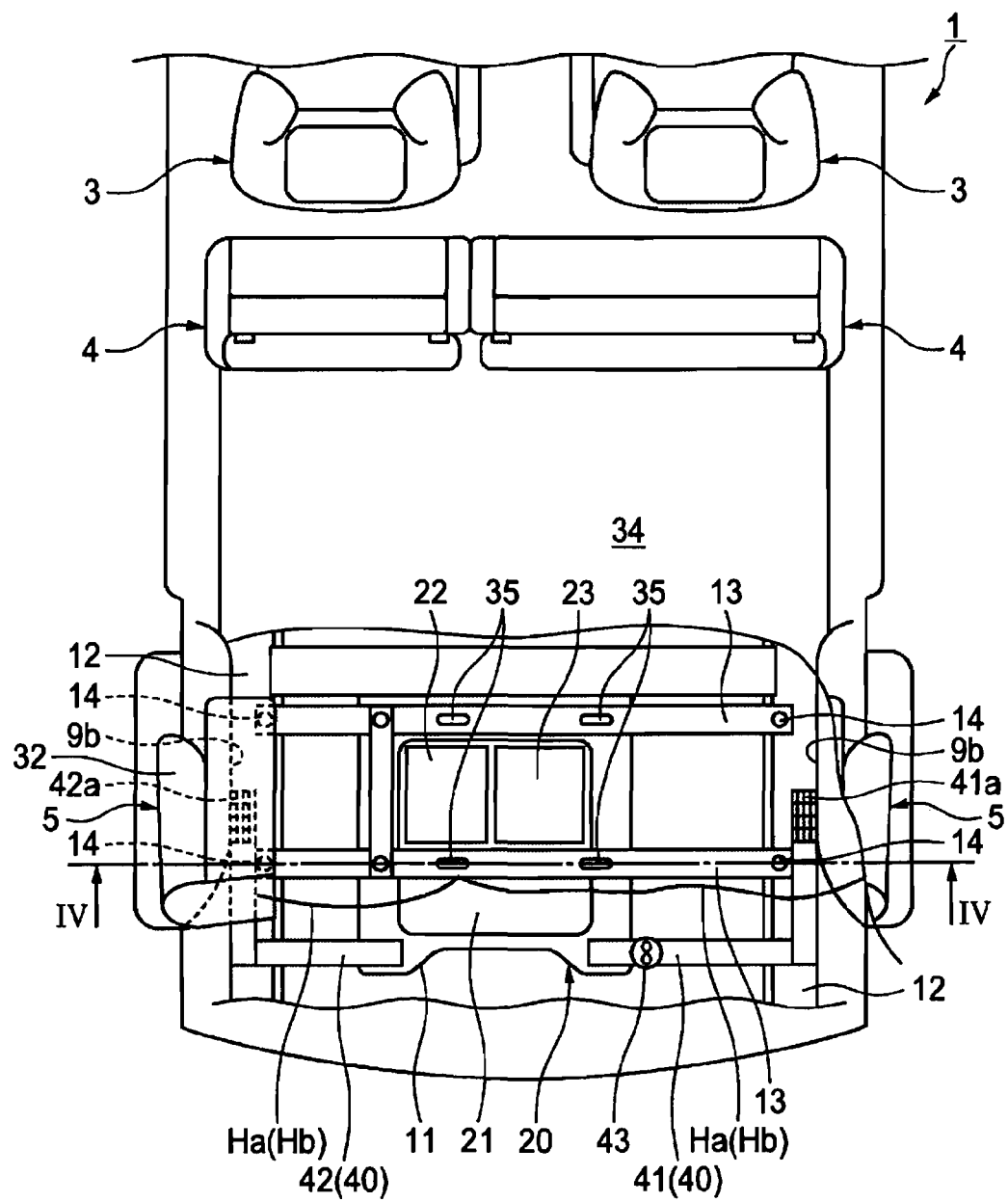
FIG. 3 is a view resulting when the interior of the passenger compartment with the third row seats swung up and a rear lid board partially cut away is seen from thereabove.
Figure 4:
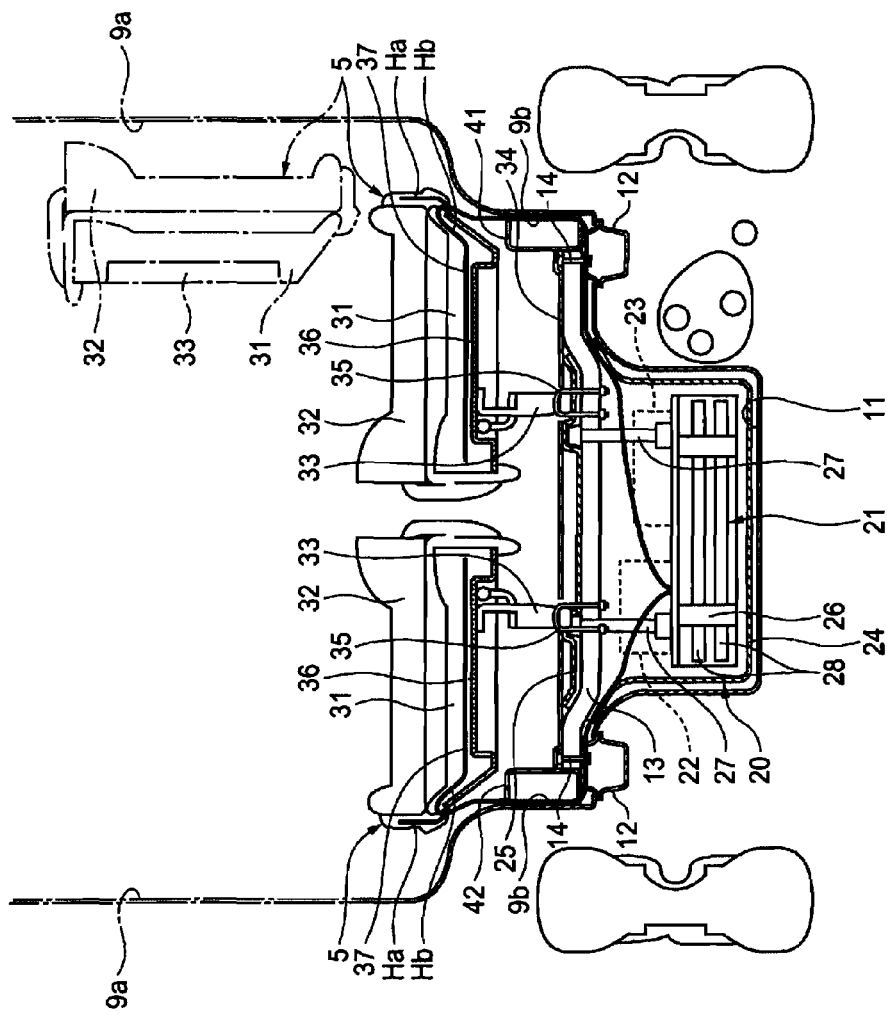
FIG. 4 is a sectional view taken along the line IV-IV in FIG. 3, with one of the third row seats swung up.

The motor/generator is a three-phase alternating current motor. Driving force of the engine and the motor/generator is transmitted to front wheels 7 as driving wheels. An electric equipment box 20 is connected to the power unit 6 via a power cable 8, and incorporates a battery unit 21, an inverter unit 22 and a DC-DC converter unit 23, as vehicle driving electric motor-related electric equipment (refer to FIGS. 3 and 4). In feeding the motor/generator from the battery unit 21, which is a direct current power supply, the inverter unit 22 converts a direct current to an alternating current.

When an output of the engine when the vehicle 1 is being decelerated or the kinetic energy of the vehicle 1 is converted into electrical energy to be stored into the battery unit 21, the motor/generator functions as a generator to generate a so-called regenerative braking force, and the inverter unit 22 converts the alternating current into the direct current to be stored into the battery unit 21. Since the direct current voltage which is converted by the inverter unit 22 is a high voltage, a part thereof is decreased by the DC-DC converter 23.

Here, the third row seats 5 each include a seat cushion 31, a reclinable seatback 32 mounted on the seat cushion 31, and a foldable seat locking mechanism 33 mounted on a lower surface of the seat cushion 31 for supporting the seat cushion 31 on the floor panel side. The third row seats 5 each take a seating posture by pulling out the seat locking mechanism 33 from the lower surface of the seat cushion 31 so as to be locked onto strikers 35 which are exposed from a rear lid board 34 as a floor surface and deploying the seatback 32. The third row seat 5 each take a stowing posture by folding the seatback 32 towards the seat cushion 31, releasing the locking of the seat locking mechanism 33 on the striker 35, folding the seat locking mechanism 33 into the lower surface of the seat cushion 31 and swinging up the seatback 32 and the seat cushion 31 together towards the side wall 9a.

Correspondingly with the above configuration, the electric equipment box 20 is accommodated within a depressed portion 11 which is formed by depressing a portion of the floor panel 2, at the rear part of the vehicle downwards underneath the rear lid board 34 on which the third row seats 5 taking the seating posture are positioned. Left and right side edges of the depressed portion 11 are connected to rear side sills 12, 12, respectively. The depressed portion 11 may be used as a tire pan for accommodating a spare tire, not shown.

The electric equipment box 20 includes a substantially rectangular box-shaped accommodation case 24 which has an open side and a flat-plate-shaped cover 25 which closes the open side. Both transversely end portions of a pair of front and rear suspension frames (sub-frames) 13, 13, which extend in a vehicle width direction while being sandwiched by the accommodation case 24 and the cover 25, are fixed to upper surfaces of the left and right rear sills 12, 12 with bolts 14 . . . . Consequently, the electric equipment box 20 is supported/suspended on the left and right rear side sills 12, 12 via the pair of front and rear suspension frames 13, 13.

Battery supporting frames 26, 26 are connected to the pair of suspension frames 13, 13 with long bolts 27. And, plural battery modules 28 are bound together by the battery support frames 26, 26 which are arranged longitudinally and vertically and are supported/suspended on the suspension frames 13, 13. The battery modules 28 extend in the vehicle width direction and each include plural battery cells which are connected in series in the vehicle width direction.

The electric equipment box 20 is disposed underneath the third row seats 5, and therefore, the strikers 35, which can be brought into engagement with the seat locking mechanisms 33 of the third row seats 5, are bolted on the pair of front and rear suspension frames 13, 13.

The electric equipment box 20 is cooled by cooling air which is taken from the passenger compartment space 9 in the vehicle 1 by a duct member 40 which extends from the electric equipment box 20. An inlet duct 41 and an outlet duct 42 are connected to the duct member 40. The inlet duct 41 takes air from the passenger compartment into the box 20 as cooling air, and the outlet duct 42 discharges the cooling air which has cooled an interior of the accommodation box 24 from the accommodation box 24. The inlet duct 41 extends to a right-hand side of the vehicle body from a right rear portion of the box 20, then projects above the floor surface and thereafter extends to the front along a lateral side of a wheel well 9b. An electric fan 43 is provided in the inlet duct 41 at a position near an entrance to the box 20. Cooling air is taken into the inlet duct 41 by vacuum produced by the fan 43. The outlet duct 42 extends to a left-hand side of the vehicle body from a left rear portion of the box 20, then project above the floor surface and thereafter extends to the front along a lateral side of a wheel well 9b. The cooling fan 43 may be provided in the outlet duct 42.

When the cooling fan 43 is activated, air is taken from the passenger compartment into the inlet duct 41 through an inlet port 41a as cooling air by vacuum produced on an upstream side of the fan 43. The cooling air so taken into the inlet duct 41 passes through the fan 43 and flows into the electric equipment box 20 to cool the battery modules 28 . . . , the inverter unit 22 and the DC-DC converter unit 23. Then, the cooling air, which has cooled the electric equipment, flows into the outlet duct 42 and is then discharged into the passenger compartment from an outlet port 42a.

In the inlet duct 41 and the outlet duct 42 which extend to the front, the inlet port 41a and the outlet port 42a thereof are opened while being inclined so as to be positioned underneath the third row seats 5 which are swung up. Thus, regardless of whether the third row seats 5 take the seating posture or the stowing posture, the third row seats 5 are positioned above the inlet port 41a and the outlet port 42a at all times. The inlet port 41a of the inlet duct 41 and the outlet port 42a of the outlet duct 42 which are opened in the inclined fashion are directed towards the back surfaces of the seat cushions 31 by fins, not shown. A foamed urethane resin 36 is provided on the back surface of each of the seat cushions 31, and therefore, inlet noise and outlet noise of cooling air, as well as impact and noise produced from the electric equipment such as the battery unit 21, the inverter unit 22 and the DC-DC converter unit 23 can be absorbed by the foamed urethane resins 36.

When servicing the electric equipment such as the battery unit 21, the inverter unit 22 and the DC-DC converter unit 23 for maintenance, the pair of third row seats 5 are swung up towards the corresponding side walls 9a so that the seats 5 can take the stowing postures. Then, the rear lid board 34 is removed to expose the electric equipment box 20 supported on the suspension frames 13, 13. In this state, the bolts 14 are removed so as to release the fastening of the suspension frames 13, 13 to the corresponding rear side sills 12, 12, whereby the electric equipment box 20 can be removed to the outside of the passenger compartment together with the suspension frames 13, 13. After the maintenance servicing on the electric equipment has been completed, the pair of suspension frames 13, 13 which support the electric equipment box 20 is fastened to the corresponding rear side sills 12, 12 with the bolts 14 in a state where the third row seats 5 are taking the stowing postures and the rear lid board 34 is removed, whereby the electric equipment box 20 can be accommodated within the depressed portion 11 in the floor panel 2. Thus, the electric equipment can be serviced for maintenance without removing the third row seats 5 from the passenger compartment space 9.

In this embodiment, the third row seats 5 are electric power seats which can electrically slide and recline and can also electrically switch the seat postures between the seating posture and the stowing posture. In the third row seats 5, wiring harnesses Ha for supplying electric power required to perform the electrically operated actions are connected to the battery unit 21, and wiring harnesses Hb for supplying electric power to electric heaters 37 which heat the seats are also connected to the battery unit 21.

According to the above-described embodiment, the third row seats 5 are provided at the rear part of the vehicle 1 so as to be swung up towards the corresponding side walls 9a. The electric equipment such as the battery unit 21, the inverter unit 22 and the DC-DC converter unit 23 is accommodated within the depressed portion 11 in the floor panel 2 which is formed by depressing the related portion of the floor panel 12. Thus, the electric equipment is disposed underneath the rear lid board 34 on which the third row seats 5, taking the seating postures, are positioned. This configuration can lower the gravity center of the vehicle 1. While arranging the electric equipment at the rear part of the vehicle, the sufficient space which allows passengers to walk therethrough can be ensured at the rear part of the vehicle by swinging up the third row seats 5. In addition, the electric equipment can be protected by the floor panel 2 whose rigidity is increased by partially being depressed downwards.

The left and right strikers 35, which are provided in the vehicle width direction and on to which the pair of third row seats 5 are detachably locked, are mounted on the pair of front and rear suspension frames 13, 13. Thus, the frames on which the strikers 35 are mounted can be shared with the suspension frames 13, 13 which support the electric equipment, thereby reducing the number of parts. Additionally, impacts produced when the third row seats 5 are swung up and are locked on to the strikers 35 can be absorbed by the suspension frames 13, 13, thereby preventing the application of impact to the electric equipment including the battery unit 21.

The battery modules 28 which are provided so as to extend in the vehicle width direction can be removed when the third row seats 5 are swung up. Thus, the maintainability of the battery unit 21 can be increased, as it is not necessary to remove the third row seats 5 from the passenger compartment 9. The battery modules 28 may be removed together with the electric equipment box 20 which is supported on the suspension frames 13, 13, as in this embodiment. Alternatively, for example, the battery modules 28 may be removed by removing the battery support frames 26 from the electric equipment box 20 or the battery modules 28 may be removed alone.

Since the foamed urethane resins 36 are provided on the back surfaces of the seat cushions 31 of the third row seats 5, impact and noise produced from the electric equipment including the battery unit 21 can be absorbed by the foamed urethane resins 36.

The inlet port 41a of the inlet duct 41 and the outlet port 42a of the outlet duct 42 are positioned underneath the third row seats 5 which are swung up and are provided to the side of the corresponding wheel wells 9b. This configuration can ensure the sufficient space which allows passengers to walk therethrough and prevent the intrusion of foreign matters. The noise absorbing effect can also be exhibited by the seat cushions 31 of the third row seats 5. And, where the inlet port 41a is provided in the above-described position, air in the low-temperature ambient within the passenger compartment can be taken into the inlet port 41a.

Since the inlet port 41a and the outlet port 42a are directed towards the back surfaces of the seat cushions 31, the absorption and insulation of noise from the inlet port 41a and the outlet port 42a can be facilitated.

The wiring harnesses Ha, Hb for operating the electric power seats and the electric heaters of the third row seats 5 are connected to the battery unit 21, and therefore, the wiring harnesses Ha, Hb can be made short in length, whereby wiring can be implemented in a simple fashion.

The electric equipment box 20 which incorporates therein the battery unit 21, the inverter unit 22 and the DC-DC converter unit 23 may be disposed not only underneath the rear lid board 34 on which the third row seats 5, taking the seating posture, are positioned but also near underneath the rear lid board 34 on which the third row seats 5, taking the seating posture, are positioned. Namely, the electric equipment box 20 may be disposed underneath a position which shifts slightly to the front, rear, left or right from the rear lid board 34 on which the third row seats 5, taking the seating posture, are positioned. Also in this case, the electric equipment box 20 can easily be removed by opening the rear lid board 34. The electric equipment box 20 may be disposed so that at least part thereof is positioned underneath the rear lid board 34 on which the third row seats 5, taking the seating posture, are positioned with the remaining part of the electric equipment box 20 extending below a position which shifts slightly to the front, rear, left or right from the rear lid board 34.

The inlet port 41a of the inlet duct 41 and the outlet port 42a of the outlet duct 42 may be disposed not only underneath the third row seats 5 which are swung up but also near underneath the third row seats 5 which are swung up. As long as the above-described advantages can be exhibited, the inlet port 41a and the outlet port 42a may be disposed underneath a position which shifts slightly to the front, rear, left or right from the rear seats which are swung up. Alternatively, the inlet port 41a and the outlet port 42a may be disposed so that at least parts of the inlet port 41a and the outlet port 42a are disposed underneath the third row seats 5 which are swung up with the remaining parts thereof extending below the position which shifts slightly to the front, rear, left or right from the rear seats.

The invention is not limited to the embodiment that has been described heretofore but can be modified or improved as required.

Figure 5:
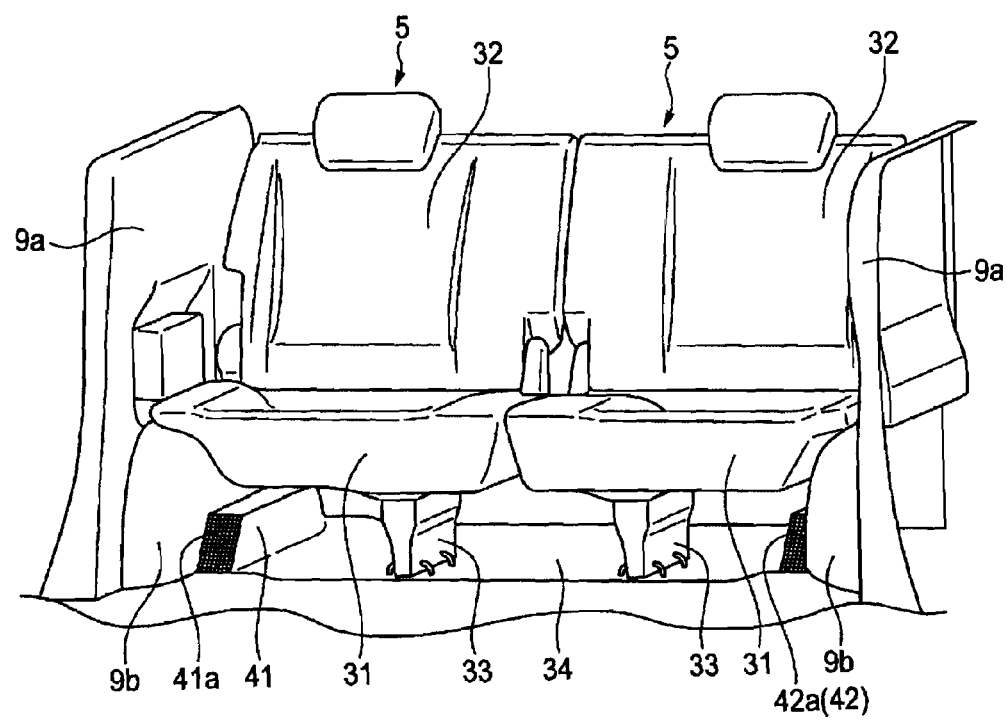
FIG. 5 is a perspective view showing the configuration of an inlet duct and an outlet duct according to a modified example of the invention.
Figure 6:
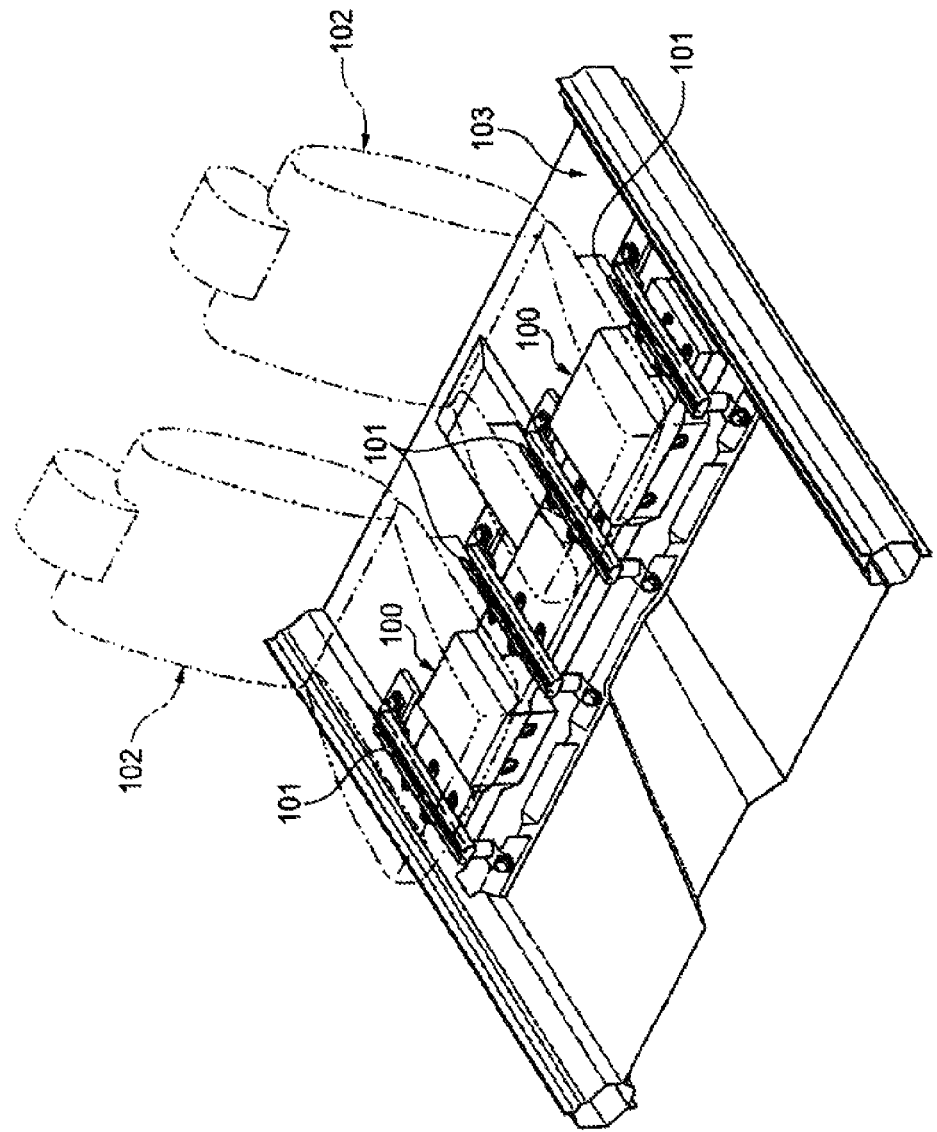
FIG. 6 is a perspective view showing a conventional electric equipment mounting structure.

In the embodiment, the inlet duct 41 and the outlet duct 42 for cooling the electric equipment are formed separately from the rear lid board 34 as the floor surface and are disposed on the rear lid board 34. However, in this embodiment, at least either of the inlet duct 41 and the outlet duct 42 may be formed integrally with the rear lid board 34. For example, as shown in FIG. 5, the inlet duct 41 and the outlet duct 42 may be formed integrally with the rear lid board 34 so as to be disposed along the sides of the wheel wells 9b. Thus, the inlet duct 41 and the outlet duct 42 can be formed easily, thereby reducing production costs. Further, the entry of dust between the inlet duct 41 and the outlet duct 42 and the rear lid board 34 can be suppressed.

In this embodiment, the hybrid vehicle is exemplified. However, the invention is not limited thereto. For example, the invention may be applied to an electric vehicle which uses only an electric motor as a driving source.

This patent application is based on Japanese Patent Application (No. 2009-174243) filed on Jul. 27, 2009, the contents of which are to be incorporated herein by reference.

DESCRIPTION OF REFERENCE NUMERALS AND CHARACTERS 1 hybrid vehicle; 2 floor panel; 5 third row seat (rear seat); 12 rear side sill; 13 suspension frame (sub-frame); 21 battery unit (electric equipment); 22 inverter unit (electric equipment); 23 DC-DC converter unit (electric equipment); 31 seat cushion; 34 rear lid board (floor surface); 35 striker; 36 foamed urethane resin; 37 electric heater; 40 duct member; 41a inlet port; 42a outlet port; Ha, Hb wiring harness.

The invention claimed is:

1. A vehicle electric equipment mounting structure for mounting vehicle driving electric motor-related electric equipment including at least a battery in a vehicle,
   wherein a rear seat is provided at a rear part of the vehicle, so as to take a seating posture by being locked on strikers exposed from a floor surface and a stowing posture by releasing the locking on the strikers and swinging up towards side walls of the vehicle,
   wherein the electric equipment is accommodated in a downwardly depressed floor panel to be positioned near underneath the rear seat taking the seating posture,
   wherein the rear seat includes a pair of rear seats capable of taking the seating posture by being locked individually on left and right strikers and the stowing posture by releasing individually the locking on the left and right strikers, the left and right strikers being provided in a vehicle width direction,
   wherein sup-frames which support the electric equipment are fixed individually to a pair of side sills which are disposed on both sides in the vehicle width direction, the sub-frames extending in the vehicle width direction, and
   wherein the left and right strikers are mounted on the sub-frames.

2. The structure of claim 1,
   wherein the battery is provided so as to extend in a vehicle width direction,
   wherein the battery can be removed in a state where the rear seat takes the stowing posture, and
   wherein a foamed urethane resin is provided on a back surface of a seat cushion of the rear seat.

3. The structure of claim 1,
   wherein at least one of an inlet port and an outlet port of a duct for cooling the electric equipment is positioned near underneath the rear seat taking the stowing posture.

4. The structure of claim 3,
   wherein at least one of the inlet port and the outlet port is directed towards the back surface of the seat cushion.

5. The structure of claim 1,
wherein wiring harnesses for activating at least one of an electric power seat and an electric heater of the rear seat are connected to the battery.

6. The structure of claim 1,
wherein at least one of an inlet duct and an outlet duct for cooling the electric equipment is formed integrally with the floor surface.

\* \* \* \* \*